Jan. 17, 1961 J. L. GRATZMULLER 2,968,320
HYDROPNEUMATIC ACCUMULATORS
Filed Aug. 6, 1956
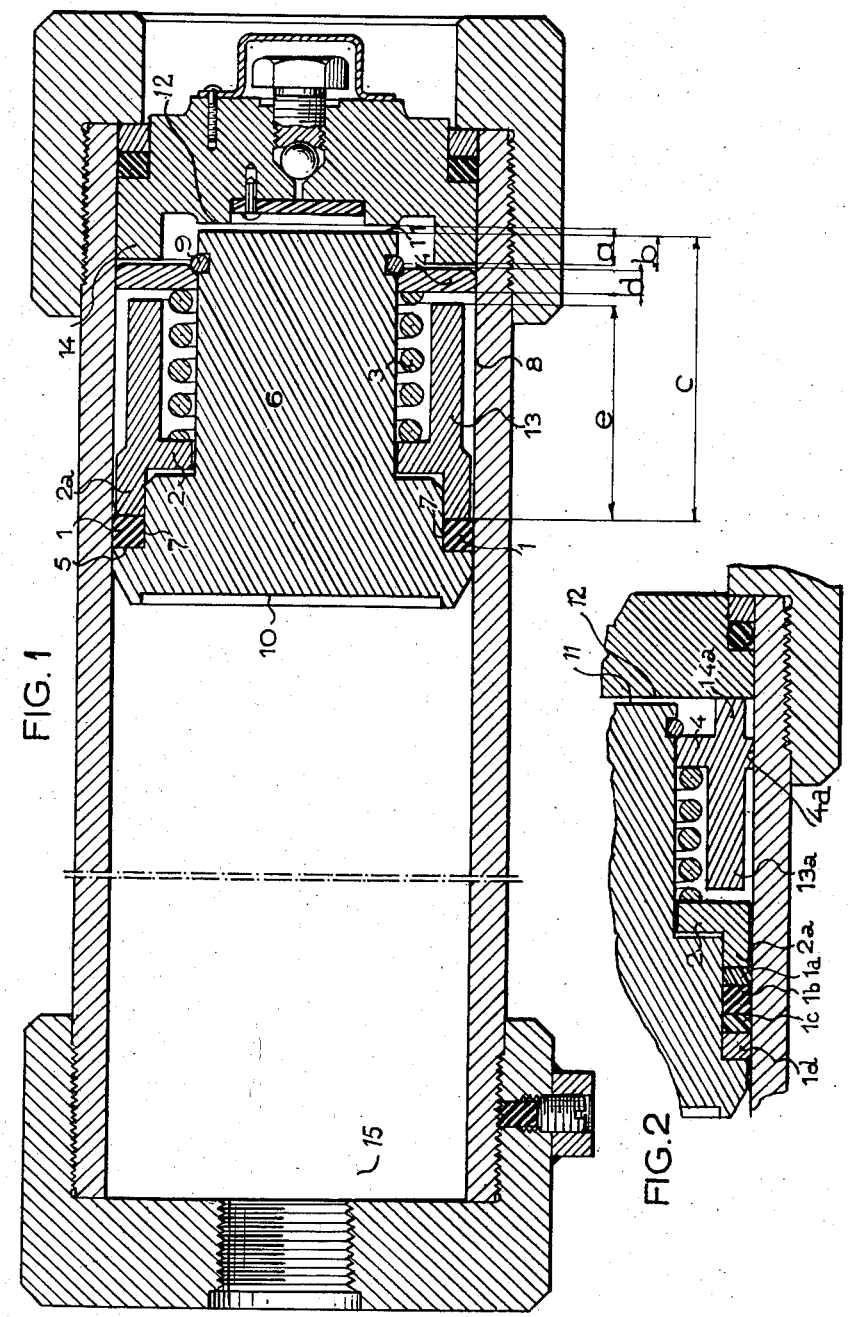
Inventor
J. L. Gratzmuller
By Glascock Downing Seebold
Attys United States Patent Office 2,968,320
Patented Jan. 17, 1961

2,968,320

HYDROPNEUMATIC ACCUMULATORS

Jean Louis Gratzmuller, 30 Ave. Georges Mandel, Paris, France

Filed Aug. 6, 1956, Ser. No. 602,329

Claims priority, application France Aug. 10, 1955

4 Claims. (Cl. 138—31)

In my U.S. patent specification No. 2,724,412, dated November 22, 1955, I have described a hydropneumatic energy accumulator and, more particularly, an oleo-pneumatic energy accumulator, consisting of a cylinder in which moves a free piston separating a space filled with compressed gas from a space into which a liquid under pressure can be introduced, said free piston carrying piston-sealing ring means of deformable material lodged in an annular space provided between the periphery of the piston and the internal wall surface of the cylinder and constantly subjected to the action of a spring interposed between an abutment means or washer and an annular member constituting seal-compressing ring means that bears against one face of the sealing ring means.

It is the object of the present invention to improve the accumulators as set forth above. Experience has established that the accumulator described in the aforesaid specification effected perfect sealing between the compressed gas and the liquid in the course of normal operation.

Nevertheless, it has been found that in certain specific applications, a condition can occur in which the gas pressure ceases to balance the liquid pressure which then drives the piston into contact with the end of the cylinder adjacent the gas space.

It will be understood that in this position of the piston, the sealing ring is subjected to a very high pressure, tending to force it out of the annular space in which it is lodged. Moreover, once the balance of pressures has been restored between the two faces of the piston, the sealing ring means may be sheared by the aforesaid annular member, when the latter resumes its normal position.

An object of the present invention is to overcome these disadvantages.

According to the invention, an accumulator as herein first described comprises stop means interposed between the seal-compressing ring means or annular member and the abutment means or washer and adapted to limit the displacement of the seal-compressing ring means or annular member towards the abutment means or washer and thus positively prevent the sealing ring means from being forced out of the annular space by unbalanced pressure of the liquid when, at the end of its stroke, the piston is arrested by the cylinder head through which the compressed gas in introduced.

The said stop means may be in the form of a tubular member surrounding the spring and having a plane face which, after a predetermined displacement of the seal-compressing ring means or annular member, in the aforesaid direction, comes to bear against the above-mentioned abutment means or washer.

Nevertheless, as a result of the fact that this washer, in the preferred embodiment of the invention, reacts against the piston only over a restricted area at its inner margin, the washer might be deformed under the action of an axial thrust exerted on an annular zone situated in the vicinity of the outer margin or periphery of the washer by the tubular stop means.

Means may be provided for preventing such a deformation of the washer. According to a preferred embodiment, these means consist of an annular stop member provided between the end of the cylinder adjacent the gas space and the adjacent face of the washer, and arranged in such a manner that, before the tubular stop member comes to bear against one of the faces of the washer, the other face thereof comes to bear, after a pre-determined travel of the piston, over a substantially equal annular zone, against said annular stop member.

The two above-mentioned stop means are thus adapted to prevent the sealing ring from being forced out of its seating and the washer from being deformed.

Nevertheless, when the piston is in abutment, as just described, these two means would not be sufficient, by themselves, to prevent the sealing ring from being subjected to the whole of the thrust due to the action of the pressure of the liquid on the piston, which might cause the said ring to be crushed.

According to a preferred form of construction, this result is obtained by an arrangement of the various stop means such that the sum of the axial dimensions of the washer, the aforesaid two stop members, and the seal-compressing means or annular member, is less than the distance between the free face of the sealing ring means and end face of the piston adjacent the cylinder head, as a result of which said end face of the piston abuts against the cylinder head before the washer is pressed against the second stop member by means of the first stop member.

The invention is illustrated by way of example in the accompanying drawings in which:

Figure 1 is a view in axial section of an accumulator such as is described in the aforesaid Patent No. 2,724,412 or my Patent No. 2,804,094, dated August 27, 1957 and comprising a device according to the invention, and Figure 2 is a section of part of another form of embodiment.

Referring first to Figure 1, 1 is a ring of deformable material, such as synthetic rubber, which is both plastic and resilient, housed in an annular space provided around the piston 6 and bounded, on the one hand by a flat-faced shoulder 5 and on the other hand by a cylindrical wall portion 7 of the piston. This ring bears with its external cylindrical face against the interior wall of the cylinder 8. The ring is kept in its seating in a state of compression, by a seal-compressing ring means or annular member 2 comprising a flange 2a, the radial extent of which is slightly less than that of the shoulder 5 against which the ring 1 bears. This member 2 is urged towards the sealing ring 1 by means of a spring 3, placed between said member 2 and an abutment means or washer 4, bearing against a retaining member 9. The head of the cylinder on the gas side is denoted at 12. The liquid under pressure is supplied to the end 15 of the cylinder, opposite to that which is bounded by the head 12, the pressure of said liquid therefore acting against the face 10 of the piston 6.

It will be understood that if the face 11 of the piston were to bear against the head 12 and the pressure of the liquid were to increase progressively, said liquid would tend to infiltrate between the sealing ring 1 and the shoulder 5, to force the sealing ring out of its seating, compressing the spring 3. According to the invention, the sealing ring 1 is held in its seating, in opposition to such a pressure, by means of a first stop member provided between the member 2 and the washer 4, said stop member taking the form, in the example in Figure 1, of a cylindrical extension 13 of the member 2 extending towards the head 12 of the cylinder from its annular portion 2. The end face of said extension 13, directed towards the washer 4, is disposed at a short predetermined distance from the said washer 4, in such a manner that after a certain axial displacement, it comes to bear against the washer 4.

It will be understood that, in order to prevent the sealing ring 1 from being forced out of its seating, it would be sufficient to cause the end face of the cylindrical portion 13 to abut against the washer 4. Nevertheless, there would then be a risk of deforming the washer 4 which only bears against the member 9 at its inner peripheral edge. In order to prevent this deformation, the invention provides a second stop member against which there bears an annular zone of the washer 4 corresponding to the zone on its opposite face against which the end face of stop member 13 bears. In the example in Figure 1, said second stop member consists of an annular skirt projection 14 provided on the head 12 of the cylinder. Moreover, if the piston were only stopped, in its travel towards the end of the accumulator, by the stops 13 and 14, the sealing ring 1 would have to sustain the whole of the thrust of the liquid over the whole surface 10 of the piston and would risk being crushed.

It is precisely in order to prevent this disadvantage that the device according to the invention comprises a set of stops arranged in such a manner as to satisfy certain precise conditions.

If $a$ is the axial extent of the stop 14, $b$ the distance between the face of the washer 4 remote from the spring 3 and the face 11 of the piston, $d$ the thickness of the washer, $e$ the total axial extent of the cylindrical portion of the composite 2a, 2 and 13 and $c$ the distance which separates the face on the gas side of the sealing ring 1 and the face 11 of the piston, $a$ should be at least equal to $b$ and the first condition would be:

$$a \geqq b$$

If this condition is fulfilled, the washer 4 will bear against the skirt 14 before the end 11 of the piston comes to bear against the head 12 of the cylinder, in such a manner that the washer 4 will be prevented from being deformed.

In order to prevent the ring 1 from being crushed, it is sufficient to meet a second condition, namely:

$$c > a + d + e$$

Actually, if this condition is fulfilled, the end 11 of the piston will meet the cylinder head 12 before the clearances between the abutment washer 4 and the member 13 and skirt 14, respectively, are taken up, which will prevent the sealing ring 1 from sustaining the whole of the thrust of the liquid on the piston 6 and thus from being crushed.

In fact, the clearances will be taken up only after the member 2, 13 has completed an additional travel, in opposition to the action of the spring 3 under the thrust applied to the sealing ring by the liquid pressure acting on the radial face thereof.

Figure 2 illustrates another embodiment in which the stop 13, instead of consisting of an extension of the member 2 towards the cylinder head 12, consists of a cylindrical portion 13a which forms an extension of the washer 4 in the direction of the member 2, while the stop 14, which in the construction shown in Figure 1 was formed by a skirt of the cylinder head 12, is replaced by a cylindrical portion 14a which forms an extension of the said washer 4 in the direction of the head 12. Thus it is sufficient, in the piston described in my above-mentioned patents, to replace the washer 4 by a tubular member 13a, 14a, with an internal annular shoulder or land 4. An external shoulder 4a is likewise provided on the member 13a, 14a, to limit the contact surface between said member and the wall of the cylinder 8, said contact co-operating in the guiding of the piston in the cylinder.

The conditions of operation of the device shown in Figure 2 for preventing, simultaneously, the ring 1 from being driven out of its seating and being crushed, and the washer 4 from being deformed, are the same as those in the embodiment shown in Figure 1.

Actually, when the piston is brought against the cylinder head 12, contact is first established between the face of the stop 14a and the cylinder head 12 as illustrated, after which the face 11 of the piston touches said head, determining a slight compression of the spring 3. The member 2 only bears against the stop 13a under the thrust of the liquid exerted on the face of the sealing ring means.

Moreover, in Figure 2, the single sealing ring is replaced, as set forth in my co-pending patent application filed August 31, 1956 for "Improvements Relating to Sealing Devices," now Patent No. 2,847,262, dated August 12, 1958, by a plurality of rings 1a–1d.

The ring 1b is made of synthetic rubber of a relatively low hardness and effects the sealing. The rings 1a and 1c of a greater hardness, and placed one on each side of the ring 1b, prevent the material of the ring 1b from "flowing" either towards the head 12 when the piston is abutting against said head and the thrust of the liquid is exerted with maximum force against the sealing device, or towards the bottom of the seating for the rings when the piston, at the end of its stroke, comes to bear against the opposite cylinder head.

Thus the sealing is effected without deformation of the ring 1b in both end positions of the piston 6.

Finally, in order to prevent the piston 6, which is preferably made of hard steel, from scratching the cylinder 8, which is preferably made of mild steel, a ring of anti-friction metal 1d is arranged in the bottom of the groove. Thus the guiding of the piston is effected by said ring 1d and by the annular portion 4a of the member 4.

What I claim is:

1. A hydropneumatic accumulator the type including a cylinder having an internal cylindrical surface and opposite ends, a cylinder head closing one end of the cylinder, means closing the other end of the cylinder and having an opening therethrough through which liquid under pressure can be introduced, a free piston within the cylinder and separating the interior thereof into a space between the piston and cylinder head that is adapted to be filled with compressed gas and a liquid receiving space between the piston and said closing means, said piston including a cylindrical surface portion coaxial with but spaced inwardly of the internal surface of the cylinder and an annular shoulder extending radially from such cylindrical surface portion toward the internal surface of the cylinder, said shoulder and cylindrical surface portion of the piston defining with said internal surface of the cylinder an annular space, a piston-sealing ring means of deformable material located in said annular space, a seal-compressing ring means for compressing said piston-sealing ring means against said shoulder, a washer between said seal-compressing ring means and said cylinder head, a spring between and in pressure contact with said washer and said seal-compressing means, said washer being mounted on said piston and including an internal marginal portion bearing against said piston, a tubular stop member surrounding said spring and connected to one of said seal compressing ring means and said washer and spaced from the other, said tubular stop member being adapted to exert a thrust on said washer over a portion thereof closer to said internal surface of the cylinder than to said piston, said cylinder head having a surface contactable by one end face of said piston, an annular stop member connected to one of said washer and cylinder head and spaced from the other, said annular stop member being in line with at least a major portion of the transverse extent of said tubular stop member and having an axial extent greater than the distance between that face of the washer directed toward the cylinder head and said one end face of the piston so that when thrust is applied to the other end face of the piston by liquid under pressure thus causing the piston to move toward said cylinder head, the movement of said washer towards the cylinder head being arrested by said annular stop member before said end face of the piston contacts the cylinder head and before axial thrust can exert undue deformation pressure on said washer via said tubular stop member.

2. The combination according to claim 1, in which said tubular stop member is integral with the seal compressing ring and said annular stop member is integral with the cylinder head.

3. The combination according to claim 1, in which said tubular stop member and said annular stop member are integral with said washer.

4. The combination according to claim 3, in which the combined washer and tubular and annular stop members are provided with an external land adapted to guide the piston in the cylinder over a small bearing surface.

References Cited in the file of this patent

UNITED STATES PATENTS

| | | |
|---|---|---|
| 1,056,529 | Fox | Mar. 18, 1913 |
| 2,619,915 | Ifield et al. | Dec. 2, 1952 |
| 2,724,412 | Gratzmuller | Nov. 22, 1955 |
| 2,804,094 | Gratzmuller | Aug. 27, 1957 |

FOREIGN PATENTS

| | | |
|---|---|---|
| 475,324 | France | of 1914 |